United States Patent [19]
Copeland

[11] 3,867,986
[45] Feb. 25, 1975

[54] METHOD FOR FORMING A CONSOLIDATED GRAVEL PACK IN A SUBTERRANEAN FORMATION

[75] Inventor: Claude T. Copeland, Tulsa, Okla.

[73] Assignee: The Dow Chemical Company, Midland, Mich.

[22] Filed: Jan. 28, 1974

[21] Appl. No.: 437,443

[52] U.S. Cl................................ 166/276, 166/295
[51] Int. Cl..................... E21b 43/04, E21b 33/138
[58] Field of Search............ 166/276, 295, 278, 280

[56] References Cited
UNITED STATES PATENTS

| 3,176,768 | 4/1965 | Brandt et al. | 166/295 |
|---|---|---|---|
| 3,285,339 | 11/1966 | Walther et al. | 166/295 |
| 3,294,168 | 12/1966 | Bezemer et al. | 166/295 |
| 3,391,738 | 7/1968 | Sparlin | 166/295 |
| 3,565,176 | 2/1971 | Wittenwyler | 166/295 |
| 3,587,742 | 6/1971 | Wittenwyler | 166/295 |
| 3,621,915 | 11/1971 | Bruist et al. | 166/276 |
| 3,625,287 | 12/1971 | Young | 166/295 |
| 3,709,298 | 1/1973 | Pramann | 166/276 |

*Primary Examiner*—Stephen J. Novosad
*Attorney, Agent, or Firm*—Bruce M. Kanuch; W. M. Yates

[57] ABSTRACT

A method for forming a permeably consolidated gravel pack in a well borehole penetrating a subterranean formation is provided. A slurry composition containing a particulate material coated with an uncured epoxy resin and a curing agent contained in a specific diluent is slurried in a liquid hydrocarbon which contains an anionic surfactant and introduced into place in the formation and allowed to cure. Preferably the slurry is injected into the well bore and formation until a screen out occurs in the well bore. The well is shut in until the resin coated particulate mass cures to form a permeable consolidated sand or gravel pack. A portion or all of the consolidated mass in the well bore is then removed therefrom.

10 Claims, No Drawings

METHOD FOR FORMING A CONSOLIDATED GRAVEL PACK IN A SUBTERRANEAN FORMATION

BACKGROUND OF THE INVENTION

Sand production from unconsolidated subterranean formations producing a petroleum liquid is an ever present problem to the petroleum industry. Furthermore, standard techniques of fracturing these unconsolidated formations have been generally unsuccessful. It is thought that the primary reason is that there has been no successful means for maintaining high conductivity through a proppant packed fracture (or a void space created by the fracturing pressure) formed in this type of formation. Two commonly used methods employed in an attempt to solve the sand production problem are (1) gravel packing and (2) plastic in situ consolidation. In a gravel packing procedure gravel, e.g. coarse sand, is packed or otherwise placed so that all the oil produced must pass through the pack before entering the production tubing. The gravel pack acts as a filter entrapping sand which is being carried by the oil. Several techniques have been employed in an effort to render the gravel pack a more efficient filter. One line of technology involves permeably consolidating the gravel pack with a resin material. U.S. Pat. Nos. 3,404,735; 3,391,738; 3,621,915 and 3,625,287 all teach different techniques which have been employed to consolidate gravel packs with a resinous material. However, all of these known techniques suffer from one or more disadvantage. In some of these techniques a certain amount of the resin from the gravel pack slurry is lost to the formation thus impeding the flow of fluids therefrom. In other systems a screen out and curing of the resin in the borehole must be avoided since the set mass is very difficult to drill out. In U.S. Pat. No. 3,621,915 it is emphasized that resin coated sand must not be allowed to cure in a well bore unless a screen assembly is present, see col. 1, lines 73–75 and col. 5, line 5 through col. 7, line 7. In many of the techniques a screen or slotted liner must be placed inside the well bore to prevent the migration of gravel from the gravel pack. In other techniques the gravel or sand employed for the gravel pack must be blended with the consolidating resin prior to mixing it with a carrying liquid, e.g. Pat. No. 3,621,915. This thus involves an additional step in the process and requires the handling of viscous resin coated sand. Furthermore, in prior art methods a compromise has had to be made between compressive strength and permeability. It has also been discovered that gravel packs must be of at least a certain thickness to provide adequate sand control, and thus it would be desirous to fracture or at least form a cavity in the formation and then place a consolidated gravel pack therein.

The present invention concerns a method of forming a permeable consolidated gravel pack in a well bore wherein the disadvantages associated with similar prior art methods are overcome.

SUMMARY OF THE INVENTION

In the present invention a slurry composition, containing an epoxy resin coated sand, a carrier liquid, a specific solvent for said resin, a curing agent, and optionally a coupling agent and a curing accelerator, is pumped into a well bore and into communication with a producing formation. A mass of the resin coated sand is screened out on the face of the formation and allowed to cure into a permeable consolidated mass. In a preferred embodiment the resin coated sand is also placed in the well bore and in communication with the face of the producing formation and in even a more preferred embodiment the slurry composition is pumped into the formation at a fracturing pressure to fracture the formation or at least form a cavity between a liner and the formation adjacent to the well bore. The entire gravel pack is allowed to cure to provide a permeable mass communicating from the well bore and out to the face of the formation. A portion or all of the gravel pack which has cured in the well bore can then be removed. Enhanced filtration is achieved if the cured pack in the well bore is only partially removed. This removal can be achieved by drilling a hole through the pack on a line which is essentially along the axis of the well bore which is smaller in diameter than the diameter of the well bore.

DETAILED DESCRIPTION OF THE INVENTION

The composition employed in the practice of the present invention comprises a slurry formed by mixing a suitable particulate material in a carrier liquid along with an epoxy resin, a solvent mixture and a curing agent. Optionally the slurry may contain a coupling agent and curing accelerator.

The epoxy resin employed in the invention comprises those organic materials possessing more than one epoxy group. Examples of the polyepoxides include 1,4-bis(2,3-epoxypropoxy) benzene, 1,3-bis(2,3-epoxypropoxy) benzene, 1,4'-bis(2,3-epoxypropoxy) diphenyl ether, 4,4'-bis(2-methoxy-3,4-epoxybutoxy) diphenyl dimethylmethane, 1,4-bis(2-methoxy-4,5-epoxypentoxy) benzene.

Other examples include the epoxy polyethers of polyhydric phenols obtained by reacting a polyhydric phenol with a halogen-containing epoxide of dihalohydrin in the presence of an alkaline medium. Polyhydric phenols that can be used for this purpose include resorcinol, catechol, hydroquinone, methyl resorcinol, or polynuclear phenols, such as 2,2-bis(4-hydroxyphenyl) propane (Bisphenol A), 2,2-bis(4-hydroxyphenyl) butane, 4,4'-dihydroxybenzophenone, bis(4-hydroxyphenyl) ethane, 2,2-bis(4-hydroxyphenyl) pentane, and 1,5-dihydroxynaphthalene. The halogen-containing epoxides may be further exemplified by 3-chloro-1,2-epoxybutane, 2-bromo-1,2-epoxyhexane, 3-chloro-1,2-epoxyoctane, and the like. The polyepoxide polymeric products of this invention may be represented by the general formula:

wherein R is a divalent hydrocarbon radical of the dihydric phenol and $n$ is an integer or the series, 0, 1, 2, 3, etc.

The above-described preferred glycidyl polyethers of the dihydric phenols may be prepared by reacting the required proportions of the dihydric phenol and the epichlorohydrin in the presence of a caustic such as sodium hydroxide or potassium hydroxide to neutralize the hydrochloric acid formed during reaction. The reaction is preferably accomplished at temperatures within the range of from about 50°C to 150°C. The heating is continued for several hours to effect the reaction and the product is then washed free of salt and base.

Another group of polyepoxides that may be used comprises the glycidyl ethers of novolak resins, polynuclear polyhydroxy phenols, which are obtained by condensing an aldehyde with a polyhydric phenol in the presence of an acid catalyst. Further preparation of novolak resins is described in the book *Phenoplasts*, 1947, p. 29 et seq., by T. S. Carswell. A typical member of this class is the epoxy resin from a condensate of formaldehyde and 2,2-bis(4-hydroxyphenyl) propane novolak resin.

The resin is employed in an amount sufficient to coat the particulate material in the slurry. Careful attention must be made to the maximum amount employed since excess resin will affect the permeability of the cured pack; can cause formation damage; and can also make it difficult to remove a portion of the cured pack from the well bore. From about 2 to about 10 pounds, preferably from about 2.5 to about 9 pounds, of resin per 100 pounds of particulate material is employed. More preferably the resin is employed in an amount ranging from about 5 to about 7 pounds per 100 pounds of sand.

A solvent is employed for the resin mixture which in conjunction with the resin is only partially miscible in the carrier liquid at ambient temperatures. Generally any polar organic solvent for the components of the epoxy resin formulation can be employed. The solvent may be, for example, an organic alcohol, ester, ether, ketone, acetone, etc. Specific solvents include, for example, 2-(2-ethoxyethoxy)-ethanol, ethyl acetate, amyl acetate, methyl ethyl ketone, methisobutyl ketone xylene, ethylene glycol n-butyl ether, diethylene glycol isobutyl ether and the like. The solvent is employed in an amount to provide a resin solvent mixture containing from about 55 to about 85 percent by weight of resin.

It has also been discovered that at lower temperatures, e.g. below about 160°F, specific blends of solvents are preferred so that initially a sufficient portion of the solvent is extracted by the carrier liquid to provide favorable low temperature cure properties while sufficient solvent remains with the resin to keep the slurry from becoming prematurely tacky and thus providing less working time than needed for placement of the resin coated gravel. Preferably a blend of from about 25 to about 35 percent by weight of an acetate ($RO_2CHR_1$) wherein R and $R_1$ are $C_3$ to $C_7$ alkyl groups; from 5 to about 15 percent by weight of an ether of $C_2$ to $C_6$ glycols containing at least one $C_1$–$C_6$ alkyl group or an aryl or alkaryl group wherein the alkyl group contains from 1 to 6 carbon atoms attached through an ether linkage and the balance, an epoxy resin, is employed. Specific glycol ethers include, for example, ethylene glycol ethyl ether, ethylene glycol n-butyl ether, diethylene glycol ethyl ether, ethylene glycol dimethyl ether, ethylene glycol phenyl ether, ethylene glycol monomethyl ether, ethylene glycol diethyl ether, ethylene glycol monopropyl ether, propylene glycol monomethyl ether, propylene glycol diethyl ether, propylene glycol monohexyl ether, butylene glycol monoethyl ether, butylene glycol dimethyl ether, butylene glycol monopropyl ether, amylene glycol dimethyl ether, hexylene glycol monomethyl ether, mixtures of such ethers and the like. Two or more of the solvents are employed which when employed in the amounts indicated allow a slurry composition of the invention to be prepared having a viscosity which allows placement within a well bore and which will cure to a permeable solid at a temperature ranging from about 60° to 160°F having a compressive strength of at least about 500 psi.

A number of curing agents, activators or catalysts are known which harden unset epoxy resins. These include, for example, amines, dibasic acids and acid anhydrides. The preferred hardening agents are the amines, especially those having a plurality of amino hydrogen groups. Included are aliphatic, cycloaliphatic, aromatic or heterocyclic polyamines, such as diethylene triamine, ethylene diamine, triethylene tetramine, dimethylamino propylamine, diethylamino propylamine, piperidine, methane diamine, triethyl amine, benzyl dimethylamine, dimethylamino methyl phenol, tridimethyl amino methyl phenol, $\alpha$-methylbenzyl dimethylamine, meta-xylene diamine, 4,4'-dimethylene dianiline, pyridine, and the like. Mixtures of various amines may be preferred. The amines or other curing agent react rather slowly to convert the polyepoxides to an insoluble form. The particular curing agent and concentration thereof can easily be determined by a knowledge of temperature conditions and available working time, i.e. length of time between adding the curing agent and final positioning of the resin-containing mixture downhole.

The curing agent can be employed in an amount ranging from about 40 to more than about 100 percent of that stoichiometrically required. The quantity of certain curing agents employed can affect the ultimate compressive strength of certain resin coated particulate materials and, therefore, in any specific formulation these factors can be determined to provide optimum systems.

The particulate material employed in the slurry can be any of those commonly employed to form gravel packs. Various sands, gravel, walnut hulls and other nut shells, synthetic resins, gilsonite, coke, glass beads and similar particulate materials can be employed. However, in the practice of this invention sand having a diameter ranging from about 0.100 to about 0.0025 inch, preferably from about 0.065 to about 0.01 inch is preferred. The sand is employed in an amount ranging from about 7 to about 20 pounds per gallon, preferably from about 9 to about 15 pounds, of the total liquid system.

The carrier liquid can be any liquid hydrocarbon which does not adversely affect the resin coated sand. Thus, it should not be a solvent for the resin but should be miscible with a portion of the solvent of the resin-solvent mixture. Kerosene, diesel oil, brightstock or any other inert hydrocarbon liquid can be employed. A hydrocarbon oil having a viscosity of from about 100 to 2500 centipoise as measured at a temperature of about 80°F can be employed. Preferably the carrier liquid has a viscosity ranging from about 200 to about 2000 centipoise.

It has also been discovered that if the carrier liquid is or becomes contaminated with a cationic organic material which is soluble in the carrier liquid that the resin will fail to adequately consolidate the sand. For example, it has been discovered that with certain bright-stock oils unsuccessful treatments resulted. Analysis of the oil showed that cationic surfactants in the form of organic materials containing active nitrogen groups, e.g. amine and amide groups, were present in amounts ranging from a few parts per million to several hundred parts per million. Other carrier oil liquids were found to be picking up traces of surfactants from hydraulic oils used to operate mixers and other field equipment employed to practice the invention.

It has been found that this problem can be alleviated by adding to the carrier oil an anionic organic material which is soluble in the carrier liquid. The anionic material should be added in an amount which is about equal to the quantity (moles) of cationic surfactant in the carrier oil. However, since analysis of the carrier liquids is difficult to conduct under field operating conditions and because it is difficult to determine exactly how much of the cationic surfactants may be picked up from hydraulic liquids, it is preferred to add from about 0.1 to about 1 percent, preferably about 0.3 to about 0.5 percent, by volume of the anionic organic material, to all carrier liquids employed in the practice of the present invention. Since some of the curing agents are themselves cationic materials, it is preferred that the anionic material be added to the carrier liquid prior to the addition of the other constituents to prevent inactivation of the curing agent. If the anionic surfactant is being added to carrier liquids which have not been analyzed for cationic materials, it is preferred to add sufficient curing agents of cationic nature such that if some portion is inactivated there still remains a sufficient quantity of curing agent to cure the resin. Suitable anionic materials include all oil soluble organic materials which do not adversely affect the formation of a consolidated gravel pack. Examples of classes of anionic materials which can be employed include certain salts of sulfonic acid, organic acid phosphates, salts of succinic acids, other salts of long chain carboxylic acids, etc.

Specific anionic surfactants found useful are sodium di(2-ethyl-hexyl)sulfosuccinate, ammonium salt of naphthalene sulfonic acid, an adduct of aliphatic ethoxylated ($C_{13}$ alcohol) organic acid phosphate with 6 moles of ethylene oxide and sodium salts of polymeric carboxylic acids. It has been found that an anionic organic material as described hereinbefore should be added to all carrier liquids having a positive reaction when an acetic acid extraction of the carrier liquid is titrated with technical grade diisobutylphenoxy-ethoxy ethyldimethylbenzyl ammonium chloride having a molecular weight of 442.

Optionally a coupling agent can be included in the slurry mixture. Suitable coupling agents are compounds having a group of atom which is capable of reacting with or being strongly held by the particulate material and having a reactive organic group which orients outwardly from the particulate material and is capable of combining with the epoxy resin. Specific coupling agents which can be employed when the particulate material is siliceous include organosilicon compounds or silanes; those coupling agents taught in U.S. Pat. No. 3,285,339 at col. 3, line 58 through col. 8, line 60 and those taught in U.S. Pat. No. 3,625,287, col. 2, lines 3–54 can be employed. The teachings of these patents are specifically incorporated herein by reference. When a siliceous material, e.g. sand or glass beads, is employed as the particulate material the coupling agent is employed in an amount ranging from about 0.01 to about 0.25 gallon per 100 pounds of said siliceous particulate material. Preferably from about 0.02 to about 0.12 gallon of a coupling agent per 100 pounds of the particulate material in the slurry is employed.

A catalyst or accelerator can also be employed in the slurry to increase the rate of cure of the epoxy resin. Known accelerators such as salicylic acid, benzoic acid, phenol, etc. in an amount ranging from about 0.5 to about 2.0 percent by weight of the total weight of the resin and curing agent can be employed.

In contrast to the method of forming a slurry and placing the slurry in a well bore to form a pack taught in U.S. Pat. No. 3,621,915 the method of the present invention is practiced as follows.

To a resin-solvent mixture is admixed a curing agent. This mixture is then blended with a carrier liquid, particulate sand, coupling agent and accelerator, if employed, in any convenient order. The mixture is blended to provide a uniform distribution of the ingredients. The formation is then treated with any desired preflushes such as diesel oil, organic solvents, acids or the like. In one embodiment a pad of fracturing fluid (e.g. brightstock oil) which is compatible with the resin coated sand is then injected into the well. When the pad reaches the formation the injection rate is increased to provide fracturing pressure on the formation to fracture the same. While maintaining fracturing conditions (pressure) in the well the slurry of resin coated material described hereinbefore is displaced into the well and formation. Just prior to displacing all the slurry into the formation the injection rate is reduced and the slurry is screened out around the casing and inside the casing to provide a permeable network which will allow fluid flow from the fracture but restrict the production of sand or fines. The slurry is followed by a driving liquid, e.g. brightstock oil or the like and a portion of the slurry is squeezed out the perforations and into the formation under fracturing pressure. The well is then shut in to allow the resin to cure. After the resin has cured the cured portion in the well bore can be drilled out. If there are no producing formations located below the level of the cured pack it is preferred to drill a hole through the pack which is smaller in diameter than the well bore. This enlarges the effective filtration depth of the cured pack. Fracturing pressures are easily determined by methods well known in the art.

Because of the unique characteristics of the cured pack formed by practicing the principles of the present invention a screen assembly, such as shown in Figure of U.S. Pat. No. 3,621,915 is not required although one may be employed if desired. The cured pack of the present invention, although having a compressive strength and permeability which is greater than that of the cured pack of U.S. Pat. No. 3,621,915, can be drilled much more readily than hereto known cured packs having other similar characteristics.

Several advantages are achieved by practicing the principles of the present invention. Because of the high concentration of solids in the slurry, the complete fill up of the fractures or lenses is assured. Because of the high conductivity path created in the formation the stresses on the formation should be lessened thus decreasing the tendency for sand production.

Example 1

A slurry of resin coated sand was prepared in the following manner. A blend of an epoxy resin comprising diglycidyl ether of bisphenol A having an epoxide equivalent weight of 182 to 190 and ethylene glycol n- butyl ether in a weight ratio of 60:40 was prepared. A curing agent comprising p,p-methylene dianiline in a weight ratio of 13:100 (curing agent: resin mixture) was mixed with the epoxy resin mixture. A slurry was then formed by blending together 30 milliliters (ml) of the above mixture with 2.4 ml. of amino triethoxysilane (coupling agent); 360 grams of sand ranging in size from about 0.033 to about 0.17 inch and 150 ml. of brightstock oil.

The slurry was blended for about 5 minutes at room temperature and then placed in a water bath maintained at a temperature of 140°F for 15 minutes to simulate heating of the slurry as it is pumped down into a well. Various samples of the slurry were then tested in one of the following manners. Procedure A: One sample was placed in a cell fitted with a moveable piston and compacted under a load of 100 psi to squeeze out the carrying oil except that which filled the pore space of the gravel pack. The cell was then placed in a 140°F bath for 24 hours to allow the resin to cure. Procedure B: A second sample of the slurry was hand packed into a mold and also allowed to cure in a 140°F bath for 24 hours. Procedure A or B was also employed in certain of the following examples to test certain properties of a cured mass.

The cured gravel pack which had been compacted at 100 psi has a compressive strength of 1950 psi and a permeability of about 100 darcies. The hand packed sample had a compressive strength of about 2400 psi and a permeability of about 165 darcies.

Example 2

A well with perforations at a density of 4 feet from 6008 to 6012 feet was treated utilizing a slurry formulation of the present invention. The well, which was a troublesome sand producer, was unsuccessfully treated with sand consolidation resins on two different previous occasions. Several barrels of a slurry was prepared by blending the following ratio of constituents - 210 gallons of brightstock oil having a viscosity of 1100 centipoise at 80°F; 3800 pounds of gravel ranging from about 0.017 to 0.033 inch; 3 gallons of gamma aminopropyl triethoxy silane and 38 gallons of the resin-solvent mixture described in Example 1. This slurry contains a total of about 5.6 pounds of resin and curing agent per 100 pounds of sand. The well was prepared for treatment by performing a matrix acidizing treatment with 200 gallons 15% HCl followed by 200 gallons regular Mud Acid. The Mud Acid was followed with 6 barrels filtered field salt water, 10 barrels diesel oil, 1 barrel brightstock oil, seven barrels of the slurry mix of the invention, 3 barrels brightstock oil, a wiper plug, and 22 barrels of diesel oil. When approximately 4¾ barrels of the slurry mix had been squeezed out the perforations, the injection pressure increased rapidly from 1500 psi to 3000 psi indicating a sandout or screenout. At this point, with approximately 2¾ barrels of slurry still inside the well bore, pumping was ceased and the well was shut in. After waiting overnight for the resin to cure and bond the gravel together, the consolidated gravel inside the well bore was drilled out using conventional techniques. With 5000 pounds of weight on the bit, the cured bonded gravel drilled out at a rate of nearly two-thirds foot per minute. This drilling rate is about five times faster than that at which cured neat portland cement, frequently used in cement squeeze work in the oil field, can be drilled out. One month later the well was reported to be producing close to 340 barrels of fluid per day, sand-free.

Example 3

The compressive strength of various resin-sand slurries was determined by Procedure B described in Example 1. In each sample a slurry was prepared containing 200 ml. of brightstock oil (viscosity 1100 centipoise at 80°F); sand (0.017 to 0.033 inch) 480 grams; gamma aminopropyl triethoxy silane 3.2 ml; and a resin mixture (resin, solvent and curing agent) 40 ml. The resin employed was diglycidyl ether of bisphenol A. The curing agent was p,p-methylene dianiline. Table I sets forth the per cent by weight of resin, solvent and curing agent present in the resin mixtures. The results of the tests are set forth in the following Table I.

TABLE I

| Test No. | Resin Percent by wt. | Solvent | % wt. | Curing Agent | % wt. | Cure Time | Cure Temp | Compressive Strength |
|---|---|---|---|---|---|---|---|---|
| 1 | 60 | ethylene glycol n-butyl ether (EGB) | 40 | ²MDA | 20.8 | 24 | 140°F | 2400 |
| 2 | 60 | amyl acetate | 30 | MDA | 29.8 | 24 | 140°F | 2900 |
| 3 | 60 | EGB xylene diethylene glycol ethyl ether (DEE) | 10 22.5 17.5 | MDA | 20.8 | 24 | 140°F | 1530 |
| 4 | 60 | EGB DEE | 22.5 17.5 | MDA | 20.8 | 24 | 140°F | 1100 |
| 5 | 50 | EGB | 50 | MDA | 13 | 24 | 140°F | 375 |
| 6 | 60 | amyl acetate | 40 | ³MDA | 13 | 24 | 90°F | 2280 |

²MDA is p,p-methylene dianiline
³Includes in addition salicylic acid — 2 per cent by weight of the resin solvent-curing agent-mixture Example 4

The effect of sand concentration on the compressive strength of a cured pack was determined employing two different resin systems.

Resin System A consisted of, as parts by weight, diglycidyl ether of bisphenol A - 60 parts; ethylene glycol n-butyl ether - 40 parts and p,p-methylene dianiline - 13 parts.

Resin System B consisted of, as parts by weight, diglycidyl ether of bisphenol A - 60 parts; amyl acetate - 30 parts; ethylene glycol n-butyl ether - 10 parts and p,p-methylene dianiline - 18.5 parts.

In each slurry the sand ranged in size from about 0.017 to 0.033 inch. The resin system was employed in an amount to provide about 5.6 to 5.7 pounds of resin system per 100 pounds of sand. The quantity of sand employed is set forth in Table II. Gamma aminopropyl triethoxy silane was also employed in the slurries. The slurry was hand compacted and cured at 140°F for from about 18 to 24 hours. The compressive strength of the cured packs are set forth in Table II.

TABLE II

| Test No. | Sand Conc lbs/gal* | Resin System Used | Compressive Strength (psi) |
|---|---|---|---|
| 1 | 15 | A | 2370 |
| 2 | 12 | A | 2050 |
| 3 | 9 | A | 1520 |
| 4 | 6 | A | <500 |
| 5 | 15 | B | 2900 |
| 6 | 5 | B | 378 |
| 7 | 5** | B | 1537 |

*Lb/gal of total liquid used in system
**Used resin conc. of about 11.2 to 11.4 pounds per 100 pounds of sand Example 5

Tests were run to determine the effect of resin concentration and gravel concentration on the permeability of cured systems. The slurries were cured according to Procedure B, Example 1. The resin-solvent-curing agent was that described in Example 1.

TABLE III

| Pounds Active Epoxy Resin and Curing Agent/100 lb Sand | Gravel Size U.S. Sieve No. | Gravel Conc lb/gal* | Permeability (darcies) |
|---|---|---|---|
| 8.4 | 40–60 | 10 | 23 |
| 11.2 | 20–40 | 7.5 | 45 |
| 14.0 | 20–40 | 15 | 20.5 |
| 5.6 | 20–40 | 15 | 76.0 |
| 5.6 | 40–60 | 15 | 165.0 |

*Lb/gal of total liquid in system

Example 6

The effect of sand size on the permeability of a cured pack was determined using the resin-solvent-curing agent system and Procedures A and B described in Example 1. The results of these tests are set forth in the following Table IV.

TABLE IV

| Gravel Size | | Natural Gravel Permeability (darcies) | Permeability (darcies) | |
| Diameter (inches) | U.S. Sieve Number | | Compacted | Uncompacted |
|---|---|---|---|---|
| .066 ± .094 | 8–12 | 200+(1) | 200+ | 200+ |
| .033 × .079 | 10–20 | 200+ | 200+ | 200+ |
| .023 × .047 | 16–30 | 171 | 119 | 146 |
| .017 × .033 | 20–40 | 110 | 99 | 165 |
| .010 × .017 | 40–60 | 46 | 40 | 76 |

(1)The upper limit of the permeability apparatus was 200 darcies

Example 7

In this example the effects of gravel size and resin concentration on the drill rate of cured packs was determined. The resin-solvent-curing agent system and Procedure B of Example 1 were employed. The drilling rate was determined employing a standard core drill. The time to drill completely through a 2-inch thickness of cured slurry was utilized to determine the drilling rate. The results of these tests are set forth in the following Table V.

TABLE V

| Test No. | Gravel Size U.S. Sieve No. | Resin Conc. lbs/100 lbs Sand | Compressive Strength (psi) | Drilling Rate (mm/sec) |
|---|---|---|---|---|
| 1 | Neat Portland Cement (46% water) cured at 170°F for 24 hours | | 5123 | .78 |
| 2 | 20–40 | 5.6 | 2370 | 5.88 |
| 3 | 20–40 | 14.0 | 2370 | 4.04 |
| 4 | 10–20 | 5.6 | 1530 | 4.55 |
| 5 | 10–20 | 14.0 | 3004 | 1.54 |
| 6 | 16–30 | 5.6 | 2260 | 5.53 |
| 7 | 16–30 | 14.0 | 2413 | 2.79 |
| 8 | 40–60 | 5.6 | 1472 | 7.28 |
| 9 | 40–60 | 14.0 | 1946 | 2.70 |

Example 8

In this example slurries containing the Resin System A and/or B as described in Example 4 were prepared containing different sand sizes, and concentrations of resin system per 100 pounds of sand. Compressive strengths were determined by employing the hand compaction procedure described in Example 1.

TABLE VI

| Resin System | Gravel U.S. Sieve No. | Resin Conc. lbs/100 lbs Sand | Compressive Strength (psi) |
|---|---|---|---|
| A | 20–40 | 14 | 2370 |
| A | 20–40 | 5.6 | 2370 |
| A | 20–40 | 4.5 | 1640 |
| A | 20–40 | 3.4 | 760 |
| A | 20–40 | 2.8 | 525 |
| B | 10–20 | 5.7 | 2286 |
| B | 10–20 | 4.6 | 2300 |
| B | 10–20 | 3.4 | 1725 |
| B | 16–30 | 5.7 | 2740 |
| B | 16–30 | 4.6 | 2370 |
| B | 16–30 | 3.4 | 770 |

Example 9

The invention was successfully practiced in an oil producing well in the following manner. The formation was located in a field known to have many troublesome sand producers.

First, 21 barrels of diesel oil were injected into the formation through perforations in the casing. The diesel oil was followed by 2.5 barrels of brightstock oil, 8 barrels of epoxy resin coated gravel slurry of the present invention (same proportions as Resin System A, Example 4), 4 more barrels of brightstock oil, 3.75 barrels of diesel oil, a wiper plug and 17.5 barrels of salt water as a driving fluid. The 14 barrels of fluid which were injected ahead of the gravel slurry were injected at a rate of 2 barrels per minute and up to 2400 psi. When the gravel slurry reached the formation the injection rate was reduced to 1 barrel per minute. After about 3.5 barrels of slurry had been displaced through the perforations a screen out occurred in the well bore. The well bore was shut in overnight to allow the resin to cure. The next morning the resin coated gravel which had set up in the borehole was easily drilled out using conventional drilling techniques. The well was placed back on production and produced 120 B.O.P.D. (barrels of oil per day) sand free. Approximately 45 days later the well was producing 169 B.O.P.D. which was above the expected potential of the well. In a similar well when nonfracturing injection rates were employed only about 1 barrel of the resin coated gravel could be placed through the perforations. The results of the latter treatment were considered to be only fair.

Example 10

A slurry of diglycidyl ether of bisphenol A resin, a particular solvent for the resin, a coupling agent, a carrier oil (brightstock), p,p-methylene-dianiline, salicylic acid and sand prepared in the manner described below was cured at a temperature of 90°F and the compressive strength of the cured specimens was determined. The results of the tests and the solvents employed are set forth in the following Table VII.

A blend of the epoxy resin and solvents, as indicated in Table VII were prepared (labeled and referred to in Table as Resin Formulation Tested). To 100 gram samples of the blends prepared in the previous step was added 18.5 grams of p,p-methylene-dianiline as curing agent and 2.44 grams of salicylic acid as curing accelerator (labeled as Catalyzed Resin Mix). The following materials were then blended together.

| | |
|---|---|
| Brightstock Oil (Shell's Valvata 79) | 150 ml |
| U.S. Sieve No. 20–40 Sand | 360 grams |
| Gamma — aminopropyltriethoxysilane | 3.2 ml |
| Catalyzed Resin Mix | 40 ml |

After blending the above described mixture for 5 minutes at room temperature, the mixing container was capped and placed in a 90°F bath for 15 minutes. The resin coated gravel was then hand-packed into molds which were placed in a 90°F bath to allow the resin to cure. After 18 hours the cured specimens were removed from the molds and tested for compressive strength. The results of these tests are set forth in the following Table VII.

TABLE VII

| | | Resin Formulation Tested | | | | Compressive Strength (psi) After 18 Hr Cured at 90°F |
|---|---|---|---|---|---|---|
| Test No. | Resin | Solvent A | % (w) | Solvent B | % (w) | |
| 1 | 60 | Dowanol DE | 40 | — | — | 0 |
| 2 | 60 | Dowanol EM | 40 | — | — | 0 |
| 3 | 60 | Dowanol EE | 40 | — | — | 0 |
| 4 | 60 | Dowanol EB | 40 | — | — | 50 |
| 5 | 60 | Dowanol EP | 40 | — | — | 165 |
| 6 | 60 | Ethyl Acetate | 30 | [1]Dowanol EE | 10 | 200 |
| 7 | 60 | Ethyl Acetate | 30 | [2]Dowanol EB | 10 | 270 |
| 8 | 60 | Ethyl Acetate | 30 | [3]Dowanol EP | 10 | 480 |
| 9 | 60 | Propyl Acetate | 30 | Dowanol EB | 10 | 1220 |
| 10 | 60 | Propyl Acetate | 30 | Dowanol EP | 10 | 1230 |
| 11 | 60 | Amyl Acetate | 30 | [4]Dowanol DE | 10 | 810 |
| 12 | 60 | Amyl Acetate | 30 | Dowanol EE | 10 | 1050 |
| 13 | 60 | Amyl Acetate | 30 | Dowanol EB | 10 | 1040 |
| 14 | 60 | Amyl Acetate | 30 | Dowanol EP | 10 | 2130 |
| 15 | 60 | Heptyl Acetate | 30 | Dowanol DE | 10 | 1170 |
| 16 | 60 | Amyl Acetate | 30 | [5]Dowanol EM | 10 | 950 |
| 17 | 60 | Heptyl Acetate | 30 | Dowanol EB | 10 | 1990 |
| 18 | 60 | Heptyl Acetate | 30 | Dowanol EP | 10 | 2440 |

[1]ethylene glycol ethyl ether
[2]ethylene glycol n-butyl ether
[3]ethylene glycol phenyl ether
[4]diethylene glycol ethyl ether
[5]ethylene glycol methyl ether

Example 11

The method of testing described in the previous Example 10 was repeated employing amyl acetate and ethylene glycol n-butyl ether wherein the weight ratio of the two solvents in the Resin Formulation Tested was varied. The results of these tests are set forth in the following Table VIII. Although the Resin Formulation Tested employed only amyl acetate as a solvent demonstrated a high cured compressive strength, the amyl acetate was so rapidly extracted into the carrier oil that a tacky slurry resulted which did not possess sufficient working time, i.e. the viscosity was too great, to allow placement of the slurry in the formation. Upon placing the resin formulation into the carrier oil the solvent was immediately extracted leaving a high viscosity mass which was difficult to handle.

TABLE VIII

| | | Resin Formulation Tested | | | | Compressive Strength (psi) After 18 Hr Cured at 90°F |
|---|---|---|---|---|---|---|
| Test No. | % (w) | Solvent A | % (w) | Solvent B | % (w) | |
| 1 | 60 | Amyl Acetate | 40 | — | — | 2040 |
| 2 | 60 | Amyl Acetate | 30 | Dowanol EB | 10 | 1040 |
| 3 | 60 | Amyl Acetate | 20 | Dowanol EB | 20 | 350 |
| 4 | 60 | Amyl Acetate | 10 | Dowanol EB | 30 | 200 |

Example 12

An oil well with perforations at a density of four/foot from 3134 to 3138 feet was treated using one of the slurry compositions of the present invention. This well was in a field which is plagued with sand production. The well was treated by pumping the following sequence of fluids down the tubing. Thirteen barrels of diesel oil was injected into the formation at a rate of 2 barrels per minute. The diesel oil was followed by 6 barrels of brightstock oil. The brightstock oil was followed by 10 barrels of a slurry having the following composition:

| | |
|---|---|
| Brightstock Oil (Shell's Valvata 79) | 210 gallons |
| U.S. Sieve No. 20–40 Sand | 3700 pounds |
| Gamma — Aminopropyltriethoxysilane | 3 gallons |
| Catalyzed Resin Formulation* | 40 gallons |

Resin Formulation
Component A — Resin Formulation

| | |
|---|---|
| Diglycidyl Ether of Bisphenol A Resin | 60 parts by wt. |
| Amyl Acetate | 30 parts by wt. |
| Ethylene Glycol n-butyl Ether | 10 parts by wt. |
| *Catalyzed Resin Formulation | |
| Component A (see immediately above) | 32 gallons |
| p,p-methylenedianiline | 48 pounds |
| Salicylic Acid | 6 pounds |

When approximately 1 barrel of the slurry had been squeezed out the perforations, the pressure increased rapidly from 3400 to 4200 psi indicating a sandout or screenout had occurred. Pumping was ceased and the well was shut in. After waiting overnight for the resin to cure and bond the gravel together, the consolidated gravel left inside the well bore was drilled out using conventional techniques. After the well was put back on production it was reported to be making sandfree 122 BOPD (barrels of oil per day) 1 month later and 193 BOPD and 60 BWPD (barrels of water per day) 2 months later indicating successful sand control had been obtained.

Example 13

Compressive strengths of sand consolidated following Procedure B of Example 1 and employing Resin System B defined in Example 4 were determined. Various additives were added to a brightstock carrier oil which contained cationic materials which adversely effected the consolidation of sand coated with the Resin System. The additives were mixed with the brightstock oil prior to the addition of any of the other components of the system. The presence of cationic materials was determined by titrating an acetic acid extract of the oil with technical grade diisobutylphenoxyethoxy ethyldimethylbenzyl ammonium chloride. The additive, amount of additive and compressive strength of the resin coated gravel are set forth in the following Table IX.

TABLE IX

| Test No. | Additive | Quantity % by Volume of Oil | Compressive Strength psi 24 Hours |
|---|---|---|---|
| 1 | None | — | 500 |
| 2 | Sodium di(2-ethyl hexyl) sulfosuccinate (20% by weight) in a mixture of ethoxylated fatty acid, methanol, ethanol and water | 0.5 | 2100 |
| 3 | Ammonium salt of naphthalene sulfonic acid (50% active) | 0.5 | 2250 |
| 4 | F52B Ado foam BF-1 mixture of alcohol-ethylene oxide adduct sulfated ammonium salt (50% by weight) monoethanol amine-fatty acid amide, fatty ester and, nonionic surfactant | 0.5 | 1650 |
| 5 | Sodium salt of condensed naphthalene sulfonic acid (25% active) | 0.5 | 1800 |
| 6 | Adduct of aliphatic ethoxylated organic acid phosphate with $C_{13}$ alcohol and 6 moles of ethylene oxide | 0.5 | 800 |
| 7 | Sodium di(dioctyl)sulfosuccinate 70% active in isopropyl alcohol | 1.0 | 1700 |
| 8 | Sodium di(dioctyl)sulfosuccinate (70% active in kerosene) | 1.0 | 1500 |

In the second part of this example, brightstock oils obtained from different sources were employed as the carrier liquid in the consolidation method previously described in this example. Various amounts of the surfactants employed in Test No. 1 of Table IX were added and the compressive strength of the consolidated sand was determined. The results of these tests are reported in the following Table X.

TABLE X

| Test No. | Type of Brightstock | Compressive Strengths (psi) with Various Amounts of Surfactant As Per Cent by Volume of Oil | | | |
|---|---|---|---|---|---|
| | | None | 0.1 | 0.5 | 1.0 |
| 1 | A | 500 | 1200 | 2100 | 2050 |
| 2 | B | 810 | — | 2500 | 2600 |
| 3 | C | 450 | — | 2170 | — |
| 4 | D | 400 | — | 1750 | 2150 |
| 5 | E | 3140 | 2800 | 2900 | 2600 |
| 6 | F | 2800 | — | 2700 | — |
| 7 | G* | 133 | — | 684 | — |

*Contained 0.3% by volume of SAE30 detergent oil commonly used in hydraulic systems

What is claimed is:

1. A method of forming a permeably consolidated particulate mass in communication with a permeable subterranean formation which comprises:
   a. forming a pumpable slurry by mixing together a particulate material, an epoxy resin-solvent mixture, a curing agent, a coupling agent, a carrier liquid and from about 0.1 to about 1 percent by volume based on the volume of said carrier liquid of an organic anionic surfactant, said particulate material is present in an amount ranging from 7 to about 20 pounds per gallon of liquid in said slurry, said resin-solvent mixture comprises an epoxy resin and an organic solvent for said resin which in conjunction with the resin is only partially miscible in the carrier liquid at ambient temperatures, said resin being present in an amount ranging from about 2 to about 10 pounds per 100 pounds of particulate material, and said resin solvent mixture containing from about 55 to about 85 per cent by weight of said resin,
   b. introducing said slurry through a well bore and into communication with said permeable formation, and
   c. curing said slurry in place to form a consolidated permeable mass.

2. The method of claim 1 wherein said slurry is placed in communication with said formation and also in said borehole, said entire mass is cured and a portion of the cured mass located in said borehole is removed to provide a consolidated mass extending into said borehole.

3. The method of claim 1 wherein said particulate material is a silicaeous material and said coupling agent is an organo-silicon compound.

4. The method of claim 3 wherein said resin is provided in an amount ranging from about 2.5 to about 9 pounds per 100 pounds of particulate material.

5. The method of claim 3 wherein said particulate material ranges in size from about 0.1 to about 0.0025 inch in diameter.

6. The method of claim 5 wherein said particulate material is present in an amount ranging from about 9 to about 15 pounds per gallon of liquid, said resin is present in an amount ranging from about 2.5 to about 9 pounds per 100 pounds of particulate material and said organic anionic surfactant is present in an amount ranging from about 0.3 to about 0.5 percent by volume of said carrier liquid.

7. The method of claim 1 wherein the carrier liquid is a liquid hydrocarbon having a viscosity at 80°F ranging from about 100 to about 2500 centipoise.

8. The method of claim 7 wherein said particulate material is sand which ranges in size from about 0.065 to about 0.01 inch in diameter, said sand is present in an amount ranging from about 9 to about 15 pounds per gallon of liquid in said mixture, and said resin is present in an amount ranging from about 2.5 to about 9 pounds per 100 pounds of sand.

9. The method of claim 8 wherein a sufficient amount of said mixture is pumped into said well to form a mass against said formation and also in the well bore and said entire mass is cured.

10. The method of claim 9 wherein a portion of said cured mass located in said well bore is removed.

* * * * *

UNITED STATES PATENT OFFICE
CERTIFICATE OF CORRECTION

PATENT NO. : 3,867,986
DATED : February 25, 1975
INVENTOR(S) : C. T. Copeland

It is certified that error appears in the above-identified patent and that said Letters Patent are hereby corrected as shown below:

In column 5, line 51, delete "of" before atom and insert --or--.

In column 7, line 55, delete "Several" and insert --Seven--.

In column 9, Table IV, item 1 in column 1, delete "$\pm$" and insert --x--.

In column 15, line 25, before "7" insert --about--.

Signed and sealed this 15th day of July 1975.

(SEAL)
Attest:

RUTH C. MASON
Attesting Officer

C. MARSHALL DANN
Commissioner of Patents
and Trademarks